United States Patent [19]
Greiss

[11] 4,022,404
[45] May 10, 1977

[54] UPPER DECK MAIN GALLEY IN A THREE DECK, WIDE-BODIED PASSENGER AIRPLANE

[75] Inventor: Rashad S. Greiss, Mercer Island, Wash.

[73] Assignee: The Boeing Company, Seattle, Wash.

[22] Filed: Oct. 22, 1975

[21] Appl. No.: 624,961

[52] U.S. Cl. .............................. 244/118 P; 186/1 R
[51] Int. Cl.² ........................................ B64D 11/04
[58] Field of Search ....... 244/118 R, 118 P, 117 R, 244/119, 129 R; 105/327, 340; 186/1 R; 187/3

[56] References Cited
UNITED STATES PATENTS

| | | | |
|---|---|---|---|
| 313,454 | 3/1885 | Strong | 105/327 |
| 1,061,484 | 5/1913 | Lowe | 244/118 |
| 1,753,068 | 4/1930 | Ross | 244/27 |
| 1,796,668 | 3/1931 | Sarfaty | 186/1 R |
| 1,867,568 | 7/1932 | Hirshfeld | 187/3 |
| 3,102,607 | 9/1963 | Roberts | 244/118 P |
| 3,295,635 | 1/1967 | Cahn | 244/118 P |
| 3,517,899 | 6/1970 | Vernon | 244/118 P |
| 3,558,086 | 1/1971 | Kraly | 244/118 P |

FOREIGN PATENTS OR APPLICATIONS

| | | | |
|---|---|---|---|
| 484,488 | 7/1952 | Canada | 244/118 |
| 1,126,908 | 4/1962 | Germany | 105/327 |
| 1,175,717 | 8/1964 | Germany | 105/340 |

OTHER PUBLICATIONS

Graham, "747 - A New Standard," Interavia, Oct., 1969, p. 1664.
"The Boeing 747 and Airport Facilities," Interavia, July, 1968, p. 855.
Prototype and Production Forms," Flight, Sept. 29, 1949, pp. 417–419.
Nibloe, "Quantas and Introduction of the 747," Interavia, Nov., 1971, pp. 1256–1257.

Primary Examiner—Trygve M. Blix
Assistant Examiner—Galen L. Barefoot
Attorney, Agent, or Firm—Christensen, O'Connor, Garrison & Havelka

[57] ABSTRACT

An aircraft having a middle passenger-carrying deck, a lower cargo deck, and a forward, upper third deck, including an operating crew compartment, a passenger-carrying section or stateroom, and a main galley compartment in the aft portion of the third deck. The galley compartment is interconnected with an auxiliary galley compartment on the middle deck by two cart lifts through which the modular food and beverage containing carts can be elevated to the upper deck galley compartment for storage and lowered to the middle deck for in-flight food and beverage service to passengers.

5 Claims, 6 Drawing Figures

U.S. Patent    May 10, 1977    Sheet 1 of 2    4,022,404
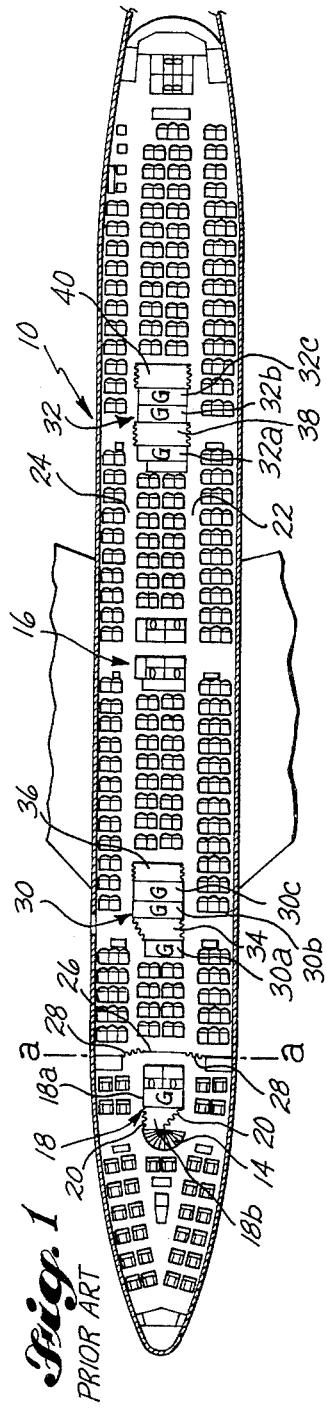
Fig. 1
PRIOR ART
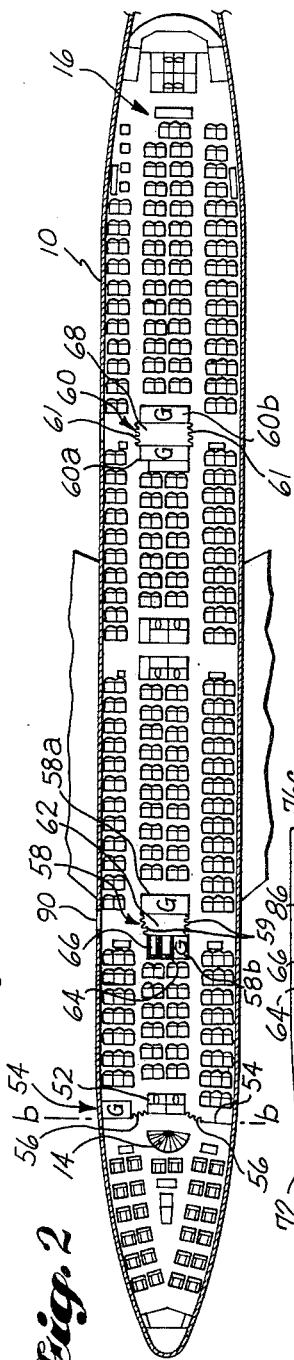
Fig. 2
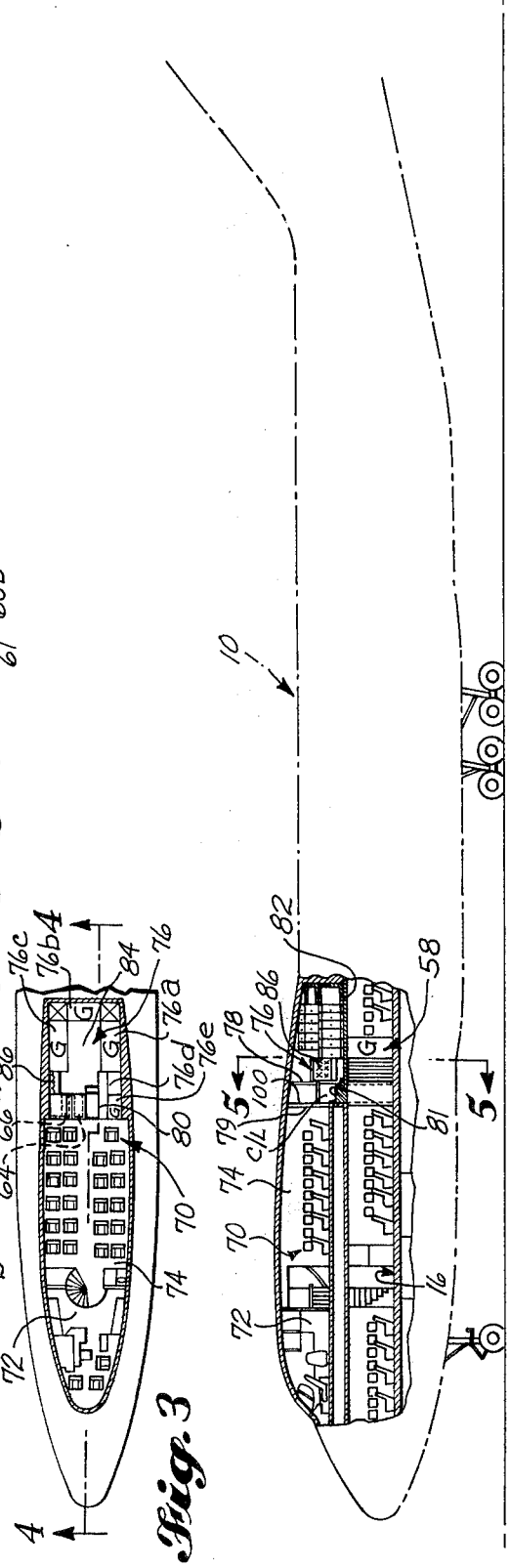
Fig. 3
Fig. 4

UPPER DECK MAIN GALLEY IN A THREE DECK, WIDE-BODIED PASSENGER AIRPLANE

BACKGROUND OF THE INVENTION

The present invention relates to an improvement in galley locations for an aircraft, and more particularly to a galley compartment located in the aft portion of the upper deck of a three deck passenger aircraft.

Food and beverages for passengers on conventional, commercial passenger aircraft are normally dispensed from storage and service centers, normally called galleys, on the main passenger deck of the aircraft. These food and beverage storage and service centers require a significant amount of premium floor space on the passenger deck that could otherwise be used for passenger seating to increase operating revenues. One prior art suggestion for increasing seating capacity on the passenger deck of a two deck aircraft, disclosed in U.S. Pat. No. 3,517,899 to R. L. Vernon, is to dispose all or a portion of the galley in the lower cargo deck of the two deck aircraft. This arrangement has met with some acceptance, eliminating some of the space requirements for galleys on the passenger deck and thereby allowing an increase in seating capacity on the passenger deck. A drawback to this arrangement is the trade-off between increased passenger seating, and consequently increased passenger revenues, and the decrease in cargo space utilized by the galley relocated on the cargo deck and a resultant loss in cargo revenues. One prior art configuration for locating all galley compartments on the main passenger-carrying deck is discussed below.

Among the objects of the present invention are: to provide a galley configuration that increases the number of available passenger seats in an aircraft; to promote a high degree efficiency in food and beverage service by effectively separating the galley facility required for the food serving function from that required for the food storage and preparation function; to provide such a food storage and preparation galley that is directly accessible to ground and flight crew members; to provide a galley configuration and location that require minimum space on the main passenger deck without affecting cargo capacity in the cargo compartment; to provide a galley configuration that requires no special equipment or techniques in ground kitchens; to provide a galley configuration that requires no special ground transportions, special aircraft loading equipment or special onboard food handling and serving; to provide a galley configuration that is tailored for maximum flexibility, interchangeability and adaptability so that conventional modular food and beverage storage and service units can be employed; to provide a galley configuration that requires no special sequencing of aircraft ground servicing equipment for galley loading and unloading; to provide a galley configuration that improves the environment in the passenger seating areas, i.e., provides a reduction in galley noise and food odor in the passenger seating areas; to provide a galley configuration in which a main galley compartment can function as a private crew rest area for long duration flights.

SUMMARY OF THE INVENTION

In accordance with the foregoing objects and other objects that will become apparent to one of ordinary skill in the art after reading the following specification, the present invention provides a galley compartment in the aft portion of the forward upper deck of a three deck aircraft, especially a three deck aircraft having a lower cargo deck, a middle passenger deck and a third upper forward deck enclosed by an aerodynamic fuselage lobe, such as employed on the Model 747 aircraft manufactured by The Boeing Company of Seattle, Wash. The galley compartment includes a forward wall incorporating an access door oriented transversely to the aircraft fuselage for partitioning the galley compartment from the forward portion of the upper deck and is so constructed and arranged as to provide in-flight food and beverage storage and preparation facilities. Modular wheel-supported carts for holding and dispensing food and beverages that are of conventional size and shape can be utilized in conjunction with the galley. The upper deck galley is interconnected with the middle passenger deck by one or more cart lifts. The cart lifts include means for elevating the carts from the middle deck to the upper deck galley compartment for storage and preparation and for returning the carts to the middle deck for passenger distribution and unloading. In a preferred embodiment, the galley compartment additionally provides a relatively isolated, private rest area for the aircraft crew after their primary duties have been completed.

BRIEF DESCRIPTION OF THE DRAWINGS

A better understanding of the present invention can be derived by reading the ensuing specification in conjunction with the accompanying drawings wherein:

FIG. 1 is a plan view in partial longitudinal section of the middle deck of a three deck passenger-carrying aircraft showing a prior art configuration for first class and economy class seating and showing the galley locations as well as the location of other necessary amenities for passenger aircraft;

FIG. 2 is a view similar to that of FIG. 1 showing the increased passenger seating capacity derived by employment of the unique galley configuration and location of the present invention;

FIG. 3 is a plan view in partial section of the aircraft of FIG. 2 showing the configuration and location of the crew compartment, the first class passenger area and the main galley on the third, upper deck of the aircraft according to the present invention;

FIG. 4 is an elevation view in partial longitudinal section of the middle and upper decks of the aircraft shown in FIGS. 2 and 3 taken along a section line similar to 4—4 of FIG. 3;

Figure 5:
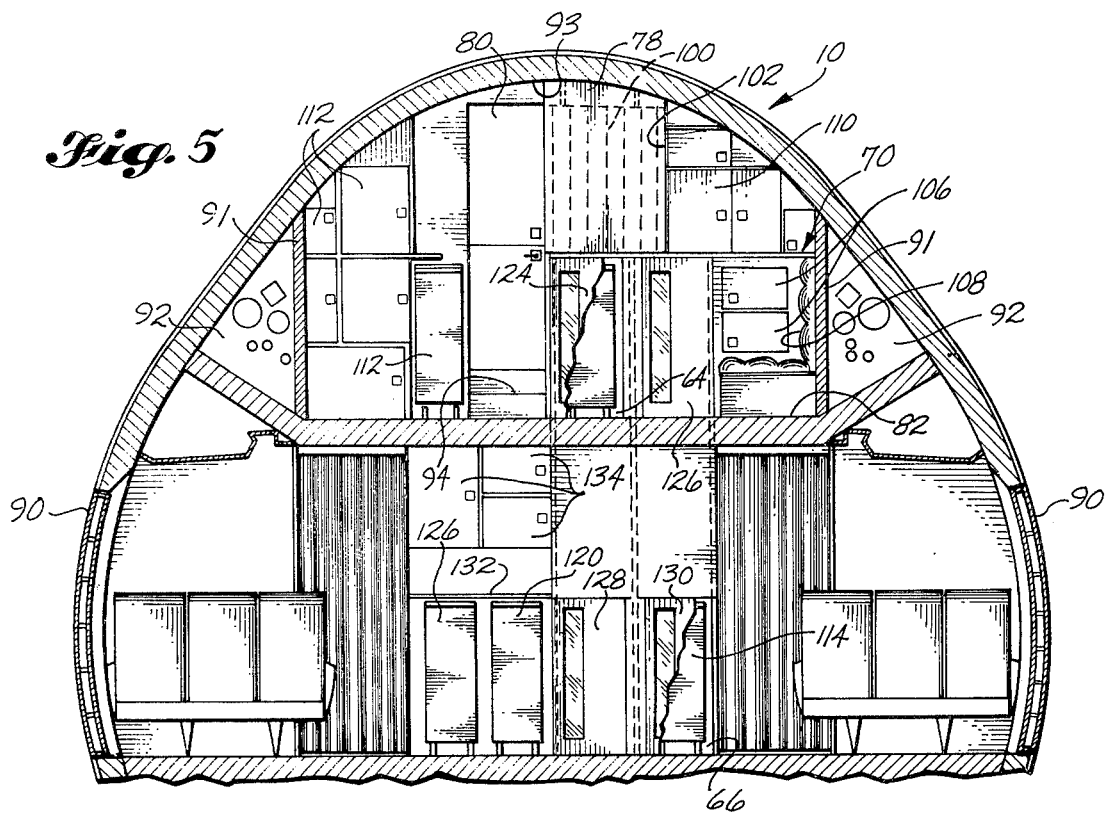
FIG. 5 is a greatly enlarged, transverse, sectional view taken along a section line similar to 5—5 of FIG. 3 of the aircraft fuselage of the present invention looking forwardly through a portion of the upper deck galley and the middle deck passenger compartment.

DESCRIPTION OF A PRIOR SEATING CONFIGURATION AND GALLEY ARRANGEMENT FOR A THREE DECK PASSENGER AIRCRAFT

FIG. 1 is a representative of the typical seating and galley configuration on the passenger deck of a three deck aircraft such as the model 747 passenger and cargo aircraft manufactured by The Boeing Company of Seattle, Wash. The prior art seating arrangement includes a first class section located forwardly of station a—a in the forward portion of the aircraft fuselage 10. The seating in the first class section of the aircraft includes luxury individual passenger seats with spacing between the seats. A central spiral stairway 14 connects the main passenger deck 16 with the upper, or third deck, in the aircraft. Conventionally the third deck is configured to provide operating crew space, including the pilots, and a stateroom or additional first class or economy class passenger seating. A conventional galley 18, including food and beverage storage, preparation, and service facilities is conventionally located aft of the stairway 14 in the first class section. The storage and preparation facilities are noted at 18a while the preparation and service personnel work area is denoted at 18b. The work area 18b is normally closed off by curtains 20, schematically indicated by a sinuous line. The tourist section of the main passenger deck 16 covers the greater proportion of the usable area on the middle deck. The tourist section begins aft of station a—a and extends rearwardly to the terminal portion of the fuselage 10. Typically, the tourist class passenger seats are arranged in side-by-side relationship with two aisles 22 and 24 separating a middle column of four seats per row from side columns of three seats and two seats per row on the port and starboard sides of the passenger deck, respectively. A partition 26 divides the first class seating and service facilities from the tourist class seating and service facilities. A pair of curtains 28 or other conventional closure members located in the aisles 22 and 24 can be opened as necessary for interclass access by onboard service crew.

A forward galley 30 and an aft galley 32 are situated in the forward portion of the tourist section and in the rearward portion of the tourist section respectively, centrally along the transverse dimension of the fuselage 10 in the middle column of seats. The forward galley 30 includes a forward galley compartment 30a, a forward crew work area 34, central and aft galley compartments 30b and 30c and aft crew work area 36. The aft galley 32 includes a forward galley compartment 32a, a forward crew work area 38, middle and aft galley compartments 32b and 32c and an aft crew work area 40. The galley compartments in each of the galleys 18, 30 and 32 provide space for in-flight storage of food and beverages as well as preparation and passenger service staging areas, including food and beverage containers, ovens, refrigerating facilities, and service carts. As can be seen, the galleys in both the first class and tourist class passenger sections require a significant amount of deck space to accommodate these storage, preparation and service facilities. The normal seating capacity of the main passenger deck with this conventional galley arrangement as shown in FIG. 1 is 364, including 34 first class passengers and 330 tourist class passengers. Although other seating configurations can slightly increase or decrease the number of passengers that can be seated on the main passenger deck, an equivalent or larger galley space is still required to serve an economical number of passengers on the middle deck. An additional conventional galley is also located on an upper deck in an aircraft having a third deck that is normally used for passenger seating.

DESCRIPTION OF PREFERRED EMBODIMENT

In accordance with the present invention as illustrated in FIGS. 2, 3 and 4, a revised seating arrangement for the passenger deck employing the upper deck galley of the present invention is illustrated. The seating configuration chosen for representation of the present invention includes a first class section forward of Station b—b of the aircraft fuselge 10. A small service galley 50 is provided on the starboard side of the aircraft, utilizing tourist passenger space rearwardly of station b—b but opening into the first class section, forming a portion of the divider 54 between the first class and tourist class passenger areas. Passenger convenience facilities 52 also form the central portion of the divider 54 between the first and economy class sections while a partition and curtains 56 form the remainder of the divider to separate the first class section from the economy section. The large, conventional galley 18 (FIG. 1) of the prior configuration has been omitted and replaced in part by additional tourist class seats. It will be noted that the divider 54 at station b—b is located forwardly from station a—a (FIG. 1) where the prior divider 28 is located. Likewise, in the economy class section of the main passenger deck, a forward service galley 58 is located adjacent the forward portion of the tourist class section while an aft service galley 60 is positioned near the aft portion of the tourist class section. The forward service galley 58 includes a central crew work area 62, a single galley compartment 58a and a secondary galley service module 58b. A pair of cart lifts, generally designated 64 and 66, the purpose for which will become more apparent below, are also located in the forward service galley 58. The aft service galley service 60 in the economy class passenger section includes a crew work area 68, a forward galley service compartment 60a, and an aft galley service compartment 60b. The crew work areas in both the service galleys can be closed off by conventional curtains 59 and 61, represented by the sinuous lines in FIG. 2. Both the forward and aft service galleys require a significantly lesser amount of space than the galleys 30 and 32 (FIG. 1) of the prior configuration. The increased seating available through utilization of the service galleys on the middle deck increases the total seating capacity for the middle deck passengers to 380, an increase of 16 passengers over the current configuration as shown in FIG. 1. An additional increase in passenger capacity of four to six seats can also be attained by deleting the conventional galley normally located on the upper deck with passenger seats.

The reduced galley space required by the service galleys 58 and 60 on the middle passenger deck is made possible by employing an upper deck galley (FIGS. 3 and 4) that includes food and beverage storage and preparation facilities. The upper deck galley is accessible from upper deck 70. The upper deck provides space for a forward operating crew compartment 72, a central first class passenger carrying compartment 74, and an upper deck galley compartment 76 located in the aft portion of the upper deck. A partition 78 separates the upper deck galley compartment 76 from the passenger carrying compartment 74 on the upper deck. A door 80, located on the port side of the center of the partition 78, provides access through the partition from the passenger carrying compartment of the upper deck to the galley compartment 76. The level of the floor 82 of the galley compartment is lower than the floor level of the passenger carrying and crew compartments on the upper deck and serves as the ceiling of the forward portion of the main deck 16. A forward portion 79 is located forwardly from portion 78 at the location normally used as the aft portion of the upper deck passenger area in prior configurations. A walkway 81 having a lowered floor relative to the upper passenger deck is provided between the partition 79 and the location of the door 80 in the partition 78.

The upper deck galley includes three segmented galley storage and service compartments 76a, 76b and 76c, described in more detail below. In addition, a large, centrally located work area 84 for service personnel is situated within the galley compartment so that the service personnel have ready access to all of the galley storage and service compartments units 76a–c. Additional storage and service facilities 76d are provided on the port side of the upper deck galley while crew seating 86 is provided on the starboard side of the upper deck galley. An additional storage and service area 76e is also provided on the port side of the walkway 81. Vertical shafts for a pair of cart lifts 64 and 66 extend downwardly from the upper deck galley to the main passenger deck at the location indicated in FIG. 2 at the forward tourist class service galley 58. The cart lifts 64 and 66 are designed to accommodate modular storage units and service carts of the type conventionally employed for food and beverage service on aircraft. The cart lifts can be of conventional design, including an elevator platform that is raised and lowered by a hydraulic mechanism or a jackscrew mechanism. Modular cart units, of a conventional size and shape can be elevated between the middle deck service galley and the upper deck galley in the cart lifts. The cart lifts are employed to load modular units replenished with a fresh supply of food and beverages into the galley storage areas in the upper deck galley, to lower dispensing carts from the preparation area of the upper deck galley to the main passenger deck to provide in-flight passenger food and beverage service, and to unload modular units from the upper deck galley during servicing of the galleys on the ground. During loading and unloading of the modular galley units, a door 90 in the side of the aircraft adjacent the forward service galley 58 on the main passenger deck is used in a conventional manner for ingress and egress of the modular units to and from the aircraft. The conventional modular units are brought from conventional loading facilities such as trucks and the like through the door 90 into the forward service galley 58 and placed in one of the cart lifts 64 and 66. They are then elevated to the upper deck galley where they are stored in the appropriate segment of the galley storage compartments 76a–d. The reverse procedure, of course, is utilized for unloading modular units after their contents have been consumed.

Figure 6:
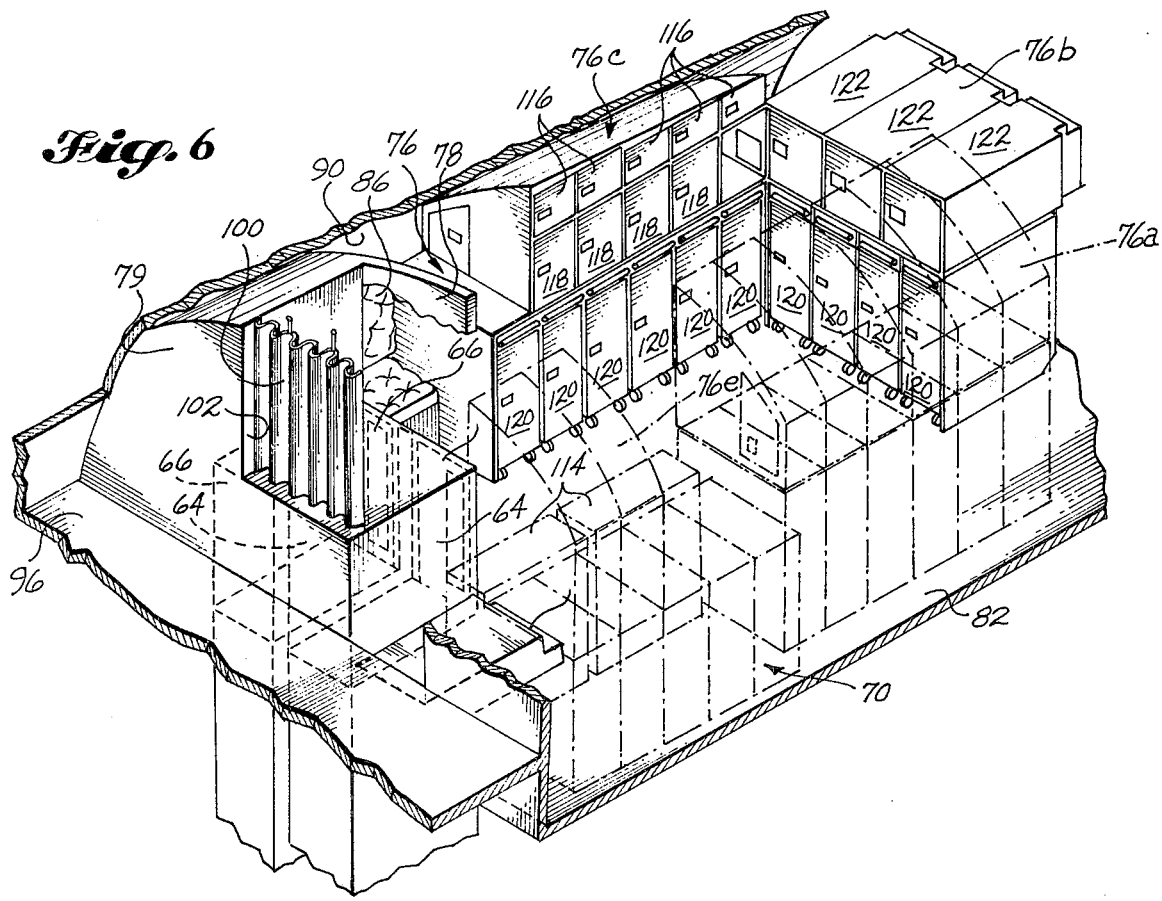
FIG. 6 is an isometric view showing the upper deck galley of the present invention with portions thereof being shown in ghost outline for clarity.

Referring conjunctively to FIGS. 5 and 6, the galley compartment 76 in the aft portion of the upper deck is bounded by the floor 83, the ceiling 93, formed by the inner shell of the fuselage 10 contoured to form the aft portion of the upper lobe, and by the sidewalls 91, by the forward partition 78, and by an aft wall (not shown). The space 92 between the vertical sidewalls 91 and the inner shell of the fuselage 10 is substantially triangular in cross-section and houses conditioned air ducts and aircraft control cables. The forward partition 78 of the galley compartment 76 is positioned immediately forwardly of the cart lifts 64 and 66 and forms the forward wall of the galley compartment and the aft wall of the passenger carrying compartment 74 of the upper deck 70. The door 80 is positioned on the port side of the center of the forward partition 78. The door is a dutch-type door having independently openable upper and lower halves. A step 94 leads downwardly from the lowered floor of the walkway 81 to the floor 83 of the galley compartment 76. The vertical shafts for the cart lifts 64 and 66 are located on the starboard side of the center of the forward partition 78. The upper ends of the shafts terminate at a counter height level. The top of the shafts are covered with a counter surface 98, which serves as a work surface for food preparation adjacent the walkway 81. A curtain or divider 102 is located coplanar with the forward partition 79, and serves to visually separate the counter surface 98 from the upper deck passenger area. Storage facilities 76e (shown in phantom outline) have doors opening into the walkway 81 and are used for storage of coffee makers and the like. The coffee makers stored in area 76e can be used in conjunction with the counter surface 95 for food service and beverage preparation for passengers in the passenger compartment of the upper deck. Storage facilities 106 are provided in the space on the starboard side of the cart lift shafts 64 and 66, and forwardly from the crew seat 108. This storage area is used for food, emergency equipment and is preferably used for storage of crew hand baggage. Warming ovens 110 are situated above the crew storage facilities 106 and to the starboard side of the door 80. Additional beverage service cabinets 112 can be located along the forward portion of the galley compartment on the port-side of the door 80. Each of the crew storage compartments, and the beverage service compartments are provided with hinged doors, each of which have latches for securing them in a closed position when not in use.

The major portion of the upper deck galley compartment 76 is utilized for food and beverage storage. The entire aft two thirds of the galley compartment comprises a first set of sub-compartmentalized galley storage and preparation units 76a, 76b and 76c. Units 76a and 76c are primarily storage units and are situated respectively on the port and starboard sides of the galley compartment. Each of the units 76a and 76c comprises an upper row of storage bins 116 and a central row of storage bins 118 that are sized to fit within the confines of the compartment. Each of the sub-compartments 116 and 118a are provided with latched swinging doors to close the bins when not in use. The sub-compartments are sized to receive conventional food and beverage service units that are normally delivered to the aircraft from ground kitchens. The lower half of each of the units 76a and 76c are provided with subcompartments sized to receive modular, wheeled, storage and service carts 120. The storage and service carts 120 are conventionally sized and provided with wheels for ease of handling during ground support operations and for use as inflight service units. The sub-compartments in the galley compartments 76a and 76c are sized so that the front end of the cart is flush with the interior side of the storage compartments when the carts 120 are in the stowed position. Each of the carts is conventionally supplied with a latch to latch the carts in the sub-compartments when not in use. The rearward storage and service unit 76b comprises a bottom row of sub-compartments to receive additional carts 120 for storage. The upper portion of the storage and service compartment 76b comprises a set of three high temperature ovens 122 used for in-flight preparation of food. Access to each of the galley storage units 76a, 76b and 76c can be gained from the large, central work area of the galley compartment 76.

The cart lifts 64 and 66 are each provided with doors 124 and 126 in the upper deck galley 76. The port door 124 to the cart lift shaft in the upper deck galley is partially broken away to show a single service cart 114 in position awaiting descent to the forward service galley 58 on the middle passenger deck 16. The cart lift shafts 64 and 66 are also each provided with a door 128 and a door 130 in the service galley 58. The starboard door 130 is shown partially broken away so that a service cart 114 can be seen ready for elevation to the upper deck galley via the cart lift 66.

As seen in FIG. 5, the forward service galley 58 on the middle passenger deck 16 has a forward portion, one-half of the space of which is taken by the cart lifts 64 and 66. To the left of the cart lifts, additional service area is provided for preparation and service of food and beverage by the crew. In the configurations shown, a counter 132 is provided as a work area for the crew. Under the counter, additional storage for two modular wheeled carts 120 or a refrigerator freezer unit and a waste cart is provided. Above the counter 132, additional subcompartments 134 having latched swinging doors are provided for additional food storage and for storage of beverage service units.

As explained above, the modular food and beverage storage service carts 114 and 120 are loaded onto the aircraft through the port and starboard doors 90. The cart lifts are located in the fuselage so that they are adjacent one of the conventionally located fuselage doors 90. So positioning the lifts reduces the distance through which the carts must be moved when being loaded and unloaded, thereby reducing the requisite turnover time for the operation. During loading, carts are moved in from food and beverage service vehicles through the doors 90, are wheeled to the cart lifts 64 and 66 and elevated to the upper deck galley compartment 76 where they are positioned in the storage units 76a, 76b and 76c. Empty carts, those which need reservicing or the contents of which have been consumed are then brought down the cart lifts 64 and 66 and exited through the doors 90 and deposited on the service vehicle. Additional cart storage is provided in the central service galley on the middle passenger deck and also in the aft service galley on the middle passenger deck. All of the storage areas are designed so that they can receive and house conventional modular storage units including the wheeled storage carts 120 and service carts 114. In addition to the wheeled storage units, hand carried units are provided for storage in the upper rows of the storage compartments 76a, 76b and 76c in the upper deck galley and in the service galleys on the main passenger deck. These hand carried units also are conventional modules that can be loaded on and unloaded from the upper deck using the cart lifts.

In addition to the advantages enumerated in and apparent from the foregoing specification, a significant advantage is that previously unused space in the upper lobe deck is being used for purposes of a galley, thus reducing the required space for galleys in passenger seating areas and eliminating the use of revenue-producing cargo space as required by the prior art. Moreover, the prior art type galley situated in the cargo area requires specialized handling equipment to load and unload the specialized, self-contained modularized units employed therein, whereas the present invention employees conventional carts and hand-carried modules that do not require special handling equipment. Moreover, the modular approach used in the prior art requires self-contained heating and refrigeration units with the attendant problems while the conventional modules employed with the present invention can use on-board heating and cooling facilities. Moreover, the upper deck galley of the present invention is directly accessible from the passenger seating area whereas the cargo deck gelleys of the prior art are normally accessible in flight only through elevators, requiring escape hatches in the passenger deck floor for use in the event of elevator failure.

As can be seen, the galley storage, preparation and the service areas of the present invention actually increase the revenue-producing passenger space on the middle passenger deck and the upper deck without unnecessarily consuming revenue-producing cargo space on the lower deck. Although the present invention has been described in conjunction with a preferred embodiment wherein the galley is located on the upper deck of a three-deck aircraft, one of ordinary skill in the art will understand that many configurations for passenger seating to maximize the passenger space and different locations for the passenger deck service galleys can be arranged to suit the needs of an individual purchaser of an aircraft. It is therefore intended that the grant of Letters Patent be limited only by the definition contained in the appended claims.

What is claimed is:

1. In a passenger aircraft having a fuselage including an upper, forward lobe thereon, said fuselage having a lower deck, a middle, passenger-carrying deck, and a third, upper deck in said lobe, said third deck having a crew compartment and a passenger-carrying section, said passenger-carrying section of said third, upper deck being interconnected by stairs with said middle deck, said fuselage having doors therein communicating from the outside of said fuselage with said middle deck for passenger ingress and egress and for loading and unloading passenger support supplies including food and beverage containers, said food and beverage containers comprising wheel-supported carts of predetermined size and shape, the improvement comprising:

a galley compartment in the aft portion of said upper deck, said galley compartment including a forward wall oriented transversely to said fuselage for partitioning said galley compartment from said passenger-carrying section of said upper deck, said compartment being so constructed and arranged as to provide inflight storage receptacles for said carts, said galley compartment including means for inflight preparation and servicing of food and beverages contained in said carts, said galley compartment including a door means for providing crew access to said galley compartment, said door means being located in said forward wall and communicating with the passenger-carrying section of said upper deck, said passenger-carrying section on said upper deck having a first predetermined floor level, said galley compartment having a second predetermined floor level lower than said first predetermined floor level so as to provide adequate headroom in said galley compartment for crew in said galley compartment;

at least one cart lift interconnecting the forward portion of said galley compartment adjacent said forward wall and said middle deck, said cart lift including means for elevating said carts from said middle deck to said galley compartment and for lowering said carts to said middle deck, and a first auxiliary compartment located on said middle deck, said cart lift opening into said first auxiliary compartment, said first auxiliary compartment being located centrally in the transverse dimension of said middle deck and adjacent at least one of said fuselage doors, said food and beverage containers being sized to fit through said passenger doors in said fuselgage, said cart lift being sized to receive only such containers, and said inflight storage receptacles being sized to receive only such containers.

2. The improvement of claim 1 wherein said first auxiliary compartment comprises a galley, said improvement further comprising:
a second auxiliary galley compartment located on said middle deck aft of said first auxiliary galley compartment.

3. The improvement of claim 2 wherein each of said auxiliary galley compartments includes inflight storage receptacles for said carts.

4. The improvement of claim 3 wherein said galley compartment further comprises:
a window for providing pass-through access between said galley compartment and said passenger-carrying section of said upper deck, said window being located in said forward wall and communicating between said galley compartment and the passenger-carrying portion of said upper deck; and
means associated with said window for closing and opening said window.

5. The improvements of claim 1 further comprising a second cart lift interconnecting said middle deck with said galley compartment in said upper deck, said second cart lift being positioned adjacent said first cart lift and opening into said first auxiliary galley compartment on said middle deck.

* * * * *